UNITED STATES PATENT OFFICE.

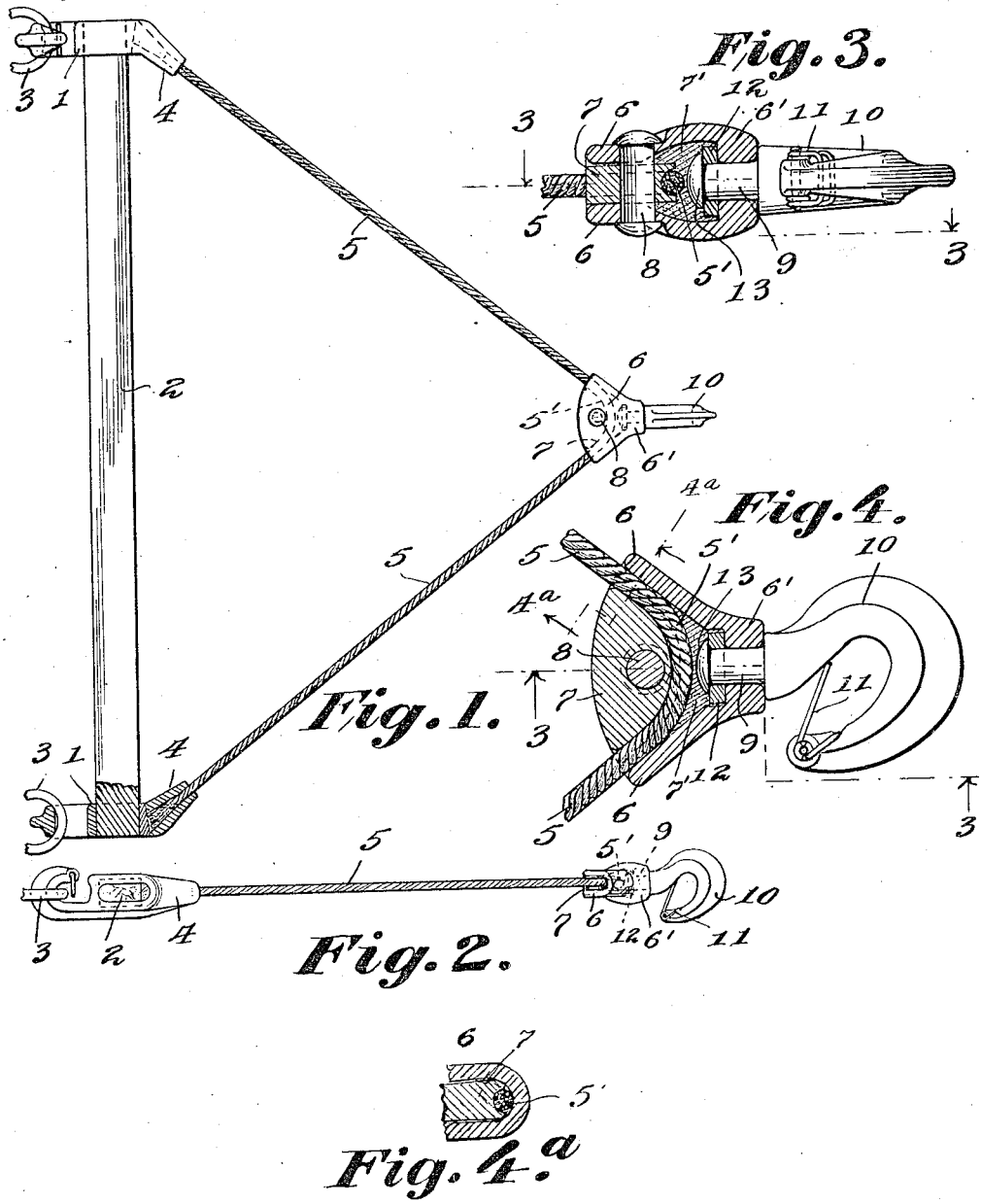

WILLIAM C. F. ZIMMERMAN, OF LONE TREE, IOWA, ASSIGNOR TO ZIMMERMAN STEEL CO., OF LONE TREE, IOWA.

DRAFT APPARATUS.

1,279,211. Specification of Letters Patent. Patented Sept. 17, 1918.

Application filed February 19, 1914. Serial No. 819,693.

*To all whom it may concern:*

Be it known that I, WILLIAM C. F. ZIMMERMAN, a citizen of the United States, residing at Lone Tree, in the county of Johnson and State of Iowa, have invented certain new and useful Improvements in Draft Apparatus; and I do hereby declare the following to be a full, clear, and exact description of the invention, such as will enable others skilled in the art to which it appertains to make and use the same.

This invention relates to improvements in team hitches of the general type set forth in detail in my Patent No. 1,202,144, granted Oct. 24, 1916.

The object of the invention is to provide a safe and reliable means of hitching to stump pullers, farm implements, contractors' tools, and other articles subjected to draft, and subsidiary to this object are the further objects of providing a light and strong hitch which is substantially incapable of being broken.

With these and other objects in view as will in part hereinafter become apparent and in part be stated, the invention comprises certain novel constructions, combinations and arrangements of parts as hereinafter specified and claimed.
In the accompanying drawing,—

Figure 1 is a plan view of a hitch embodying the features of the present invention.

Fig. 2 is an edge view thereof.

Fig. 3 is an enlarged, detail view, partly in vertical section and partly in elevation, of the center hitch, a fragment of the cable being illustrated.

Fig. 4 is a detail view of the same partly in horizontal section and partly in plan.
Fig. 4ª is a detail fragmentary section taken on the plane indicated by line 4ª—4ª of Fig. 4.

Referring to the drawings by numerals 1, 1 indicate the draft-receiving members which are spaced apart by a spacing bar 2, and which extend forwardly from the spacing bar in the form of hooks to receive the swingle tree rings 3 or other apparatus to which the draft animals are to be hitched.
Extending rearwardly from the members 1 and preferably formed as a part thereof are sleeves 4, 4, which converge rearwardly and each of which is formed with a longitudinal bore flaring forwardly. A cable 5 has its end portions extending into the bores of sleeves 4, the cable preferably being formed of wire strands and having the end portions of its strands frayed or spread apart and interfilled with babbitt within the flares of the sleeves 4 so that the cable is effectively connected to the sleeves in a manner susceptible of withstanding any amount of strain to which the apparatus is liable to be subjected during any use for which it is adapted.

The cable 5 is of a sufficient length for forming a loop outstanding rearwardly from the sleeves 4 a distance sufficient for having the arms of the loop directed substantially in alinement with the axes of the bores of the sleeves 4 and the bight or curved portion of the loop being engaged by an intermediate hitch or connecting member consisting of a clamping or engaging means for the cable and an engaging means for the device to be drawn, as, for instance, as seen in Fig. 1, the bight 5' of cable 5 extends through an arcuate socket or passageway formed in a casting or block 6, said block being internally hollow and partially filled by a filler block 7 shaped and arranged to form the arcuate passage way for accommodating the portion 5' of cable 5, said portion being firmly held by babbitt 7' or other appropriate material which is poured into the socket of casting 6 after the parts are assembled, and the block 7 being retained in position by a transverse rivet 8. The block 6 converges rearwardly to a restricted, transversely circular tubular portion 6', and through the bore of the tubular portion 6' extends the cylindrical shank 9 of a hook 10.

Hook 10 is adapted to engage the clevis of an implement or other engaged portion of a tool or instrument, or the cable surrounding the stump to be pulled. To avoid accidental release of the part engaged by hook 10, the throat of the hook is closed by a spring keeper 11 carried by the free end of the hook. The inner end portion of the shank 9 extends through a washer 12 and is swaged to form a rivet head 13 engaging the said washer resting in an annular seat formed in the material of the block 7, the washer having been applied and the head 13 formed after the assemblage of the part and before the filler 7 was introduced. Hook 10 is easily loosened from filler 7' by simply being turned after the filler has set so that hook 10 is free for adjustment to any position adapted for engaging the article to be drawn.

It is, of course, apparent that in the matter of assembling the part the head 13 is formed before the cable 5 and block 7 are introduced into the block 6, and after the head 13 has been formed the block 7 with the cable wrapped about the edge groove of the block is introduced into the block 6 until the rivet-receiving aperture of block 7 registers with the corresponding apertures of block 6, and then the rivet 8 is passed through said apertures and is swaged up to form appropriate rivet heads.

The block 7 has its inner edge formed with a longitudinal, approximately semi-circular groove, as clearly indicated in Figs. 3 and 4ª, and the cable portion 5′ is disposed in said groove before the block is introduced into casting 6, and block 7 is introduced into the socket of casting 6 sufficiently for causing the lateral portions of the block to clamp the cable against adjacent lateral portions of the walls of casting 6. The arcuate form of the groove in the edge of block 7 provides a smooth retaining surface for the cable so that the draft transmitted from the cable to the block 7 and thence to the casting 6 and its connected parts is relieved from any liability of injuring the cable incident to engagement of sharp corners by said cable.

The operation of the structure is obvious and is capable of numerous variations. The preferable operation consists in applying the hook 10 to the article to be drawn and hitching the draft animal or animals to the rings 3 or any appropriate substitute therefor. The stress of the draft is transmitted through the rings 3, members 1, sleeves 4, and cable 5 to the casting 6, hook 10, and article to be drawn.

What I claim is:—

An intermediate hitch member comprising a block having on one end an engaging means, and provided with an outwardly flaring socket in its opposite end adapted to receive the bight of a draft cable, a filler block fitting in the socket and partly filling the same and provided in its inner edge with a seating groove conforming with the bight of and adapted to receive the cable, and a filler of metal poured into the socket against the exposed portion of the cable to hold the same from sliding movement over the filler block.

In testimony whereof I affix my signature in presence of two witnesses.

WILLIAM C. F. ZIMMERMAN.

Witnesses:
 HENRY L. ZIMMERMAN,
 HARL V. MCCLUSKEY.

Copies of this patent may be obtained for five cents each, by addressing the "Commissioner of Patents, Washington, D. C."